United States Patent [19]

Haynes et al.

[11] Patent Number: 5,169,669
[45] Date of Patent: Dec. 8, 1992

[54] COOKING OILS

[75] Inventors: Louis V. Haynes; Edmund P. Pultinas, Jr., both of Cincinnati, Ohio

[73] Assignee: The Procter & Gamble Company, Cincinnati, Ohio

[21] Appl. No.: 765,336

[22] Filed: Sep. 25, 1991

[51] Int. Cl.⁵ .................................. A23D 9/06
[52] U.S. Cl. ................... 426/607; 426/541; 426/544; 426/601; 426/610; 426/654
[58] Field of Search ............... 462/601, 607, 610, 654, 462/541, 544

[56] References Cited

U.S. PATENT DOCUMENTS

| | | | |
|---|---|---|---|
| 3,186,854 | 6/1965 | Going | 99/163 |
| 3,460,948 | 11/1969 | Linteris et al. | 91/1 |
| 3,529,974 | 9/1970 | Melnick et al. | 426/610 |
| 4,093,540 | 6/1978 | Sen Gupta | 210/23 F |
| 4,568,556 | 2/1986 | McCoy | 426/603 |
| 4,806,374 | 2/1989 | Willemse | 426/330.6 |

FOREIGN PATENT DOCUMENTS

| | | |
|---|---|---|
| 296177 | 4/1988 | European Pat. Off. . |
| 411681 | 2/1991 | European Pat. Off. . |
| 59-154973 | 12/1983 | Japan . |
| 58-184635 | 7/1985 | Japan . |
| 60-78542 | 12/1985 | Japan . |
| 191519 | 3/1986 | Japan . |
| 1479494 | 5/1989 | U.S.S.R. . |
| 1200450 | 10/1970 | United Kingdom . |

OTHER PUBLICATIONS

Gunstore et al, Lipids in Foods 1983 p. 130.
Prevot, Jacos, 67, (No. 3) 161–164 (1990).
King, et al., Jacos, 66 (No. 3) 192–195 (1989).
Abstract K. K., Jaocs 65 (No. 4) 528–29 (1988).

Primary Examiner—Joseph Golian
Assistant Examiner—Evan Federman
Attorney, Agent, or Firm—Jerry J. Yetter; Rose Ann Dabek

[57] ABSTRACT

Cooking oils which have a reduced tendency to produce offensive odors when heated to frying temperatures are claimed. The oils are refined, bleached and deodorized unsaturated vegetable oils, e.g. soybean and canola and from 0.1% to 5% refined and bleached, but not deodorized sunflower seed oil. The sunflower seed oil contains terpenes which mask the fishy, painty or acrid odor and improves the oil flavor on aging.

15 Claims, No Drawings

COOKING OILS

TECHNICAL FIELD

The present invention relates to cooking oils formulated to have a reduced tendency to produce objectionable odors when heated to frying temperatures and improved flavor on prolonged storage.

BACKGROUND OF THE INVENTION

The present invention pertains to particular mixtures of vegetable oils having a reduced tendency to produce objectionable odors when heated to frying temperatures, especially after prolonged storage and which have an improved flavor on storage.

Generally, vegetable oils intended to be used for cooking or other food preparation purposes, are processed by subjecting them to the well known processes of alkali refining, earth bleaching and steam deodorization. Refining and bleaching are described in detail in Chapter 4 of Volume 2 of Baileys Industrial Oil and Fat Products, Wiley-Interscience Publishers (1982), incorporated by reference herein. Deodorization is described in detail in Chapter 3 of Volume 3 of Baileys Industrial Oil and Fat Products, Wiley-Interscience Publishers (1985), incorporated by reference herein. When treated in this manner, the fresh oil has a relatively bland odor at room temperature and a very light color.

Notwithstanding these treatments, however, when the oils (especially soybean oil and canola oil) are subjected to frying temperatures, they produce odors in the area surrounding the site of cooking. These odors are generally objectionable, and are variously described as "painty", "beany", "grassy", "fishy", "acrid", etc.

This odor is believed to be caused by the oxidation of the polyunsaturated fatty acids present in these oils, in particular linolenic and linolenic acids. Low molecular weight aldehydes, ketones, fatty acids and hydrocarbon are formed. Some of these have acrid, fishy and other disagreeable aromas.

A commonly used means of reducing the tendency of refined vegetable oils to produce objectionable odors when heated to frying temperatures is partial hydrogenation. However, the hydrogenation process must be carefully controlled to prevent the resulting oil from obtaining a lard-like consistency. Hydrogenation increases the saturation of fatty acids in the oil, which many nutritionists believe causes a reduction in the nutritional value of the oil. The number of trans fatty acids increases when the oil is hydrogenated. Saturated fats have been associated by many identical experts with increased risk of heart disease. Hydrogenation has an economic disadvantage because stearin is produced in the oil, which must be removed if the oil is to remain clear when shipped or stored in cool environments.

U.S. Pat. No. 3,758,532, Gibble, issued Sep. 11, 1973 discloses a process for treating soybean oil to improve its odor during storage and drying. In that process the refined oil is degassed, then gassed with carbon dioxide and then heated in the presence of copper chromite under a carbon dioxide atmosphere. The use of carbon dioxide and copper chromite adds to the cost of processing the oil.

The blending of vegetable oils for economic reasons and/or to obtain specific averaged physical properties or fatty acid compositions is well known. U.S. Pat. No. 4,568,556, McCoy, issued Feb. 4, 1986 discloses the use of individual oils and mixtures thereof as the "soft oil" in margarines. Preferred oils are safflower oil, sunflower oil, soybean oil and mixtures thereof. U.S. Pat. No. 3,186,854, Going, issued Jun. 1, 1965 discloses the use of mixtures of various oils and crystal inhibitors to obtain salad oils which remain clear when stored at low temperatures.

U.S. Pat. No. 3,529,974, Melnick et al., issued Sep. 22, 1970 discloses a blend of oils intended to achieve the fatty acid composition, nutritional value and physical properties of corn oil. The oil blend comprises 40–45% refined/bleached sunflower oil, 20–25% refined/bleached/hydrogenated/winterized soybean oil, 15–70% refined/bleached/winterized cottonseed oil and 3–8% refined/bleached peanut oil. The mixture of oils is deodorized after blending.

EPO publication 411,681 (1991, Procter & Gamble) relates to cooking oil compositions having a low odor producing tendency upon heating. The mixture comprises refined, bleached and deodorized sunflower seed oil, refined, bleached and deodorized soybean oil blended with refined, bleached and deodorized canola oil. The ratio of sunflower to soybean is 20:80 to 70:30.

Prevot et al., JAOCS, 67, No. 3, pages 161–164 (1990) describes the room aroma of low-linolenic rapeseed oil. This article describes the characteristic odor of sunflower as "fruity".

EPO patent application 296,177 assigned Warner Lambert (1988) describes the use of an oil soluble sensory masking agent to produce a taste masking and/or odor masking sensation for unpleasant edible oils. The masking agent is present at a level of 0.1–10%. Materials which can be used include anethole, eugenol, vanilla, and natural or artificial fruit oils, including citris and mint oils. Citrus oils are said to produce an especially pleasant tasting and pleasant smelling composition.

SU 1,479,494 (1989) describes deep drying fats to which pinene is added (0.015 to 0.017%) as an antioxidant. The fats are protected from thermal damage.

Japanese patent application 60/078, 542 (1985, Nikken Stamy) describes an edible oil blend which has a balanced fatty acid composition. Oils which can be blended include soybean oil, rapeseed oil and sunflower oil.

Japanese application 58/184,635 (1985, Nitsuken Sutamii) discloses a way to make food oils having a balanced fatty acid content. The food oil is prepared by mixing corn oil or rice oil with other oils including rapeseed and sunflower seed oil.

Abstract KK-5, JAOCS, 65, No. 4, pages 528–29 (Apr., 1988) discloses the relative flavor and oxidative stability of canola oil blends with cottonseed or sunflower seed oil. Heat accelerated oxidation was reduced when canola is blended with sunflower oil.

King, et al., "Cottonseed Oil as a Frying Medium", JAOCS, 66 (No. 2) 192–195 (1989) found that high oleic sunflower oils produced much less room aroma hen heated. Japan 59/154,973 (1983, Gakko Hojin) discloses that a monoterpene and monoterpene alcohol ester have a powerful synergistic effect as antioxidants when combined with tocopherol in fats or oils.

U.S. Pat. No. 4,806,374 (Lever, 1989) uses silicones with the linalool and linalyl acetates to make better smelling frying fats. GB, 1,200,450 (Lever, 1970) discloses frying fats in which citrus oils are added at the level of 100–1000 parts per million to reduce the development of unpleasant room odors when the oil is used for frying. Similar results can be achieved by using other essential oils.

U.S. Pat. No. 3,460,948 issued to Linteris et al. (Lever, 1969) discloses glyceride oils for frying food containing citrus oils to reduce the offensive cooking odors. From 100-1000 parts per million of the citrus oil are used.

It is the object of the present invention to provide refined, bleached and deodorized cooking oils which have a reduced tendency to produce objectionable odors when heated to frying temperatures, without the necessity of subjecting the oils to additional processing, or adding non-vegetable oil ingredients to the oil by blending refined, bleached but undeodorized sunflower seed oil with the unsaturated cooking oil. This sunflower seed oil contains terpenes and other odor producing compounds which effectively mask the malodors of the cooking oil and improve its flavor on aging.

SUMMARY OF THE INVENTION

The invention provides cooking oils having a reduced tendency to product objectionable odors when heated to frying temperatures. The oils comprise a mixture of sunflower seed oil, soybean oil, canola oil, or other polyunsaturated oil with from 0.1% to 5% of a refined, bleached but not deodorized sunflower seed oil containing the naturally occurring terpenes.

DETAILED DESCRIPTION OF THE INVENTION

In accordance with the present invention, it has been surprisingly found that when refined, bleached, but undeodorized sunflower oil is used in particular mixtures with soybean oil, canola, or other polyunsaturated vegetable or marine oils, the resulting oil composition has a substantially lower tendency to produce objectionable odors at frying temperatures than is the case when the individual oil are used.

As used herein, "unsaturated" means the oil or fat contains at least one fatty acid having one double bond.

Sunflower seed oil is a highly unsaturated oil which can be obtained form the seeds of the plant *Helionthus annuus*. High oleic sunflower seed oil is a new type of sunflower oil which is higher in oleic acid. The ratio of unsaturated to saturated fatty acids in sunflower seed oils ranges from about 10.5:1 to about 6:1 and the iodine value ranges form about 80 to 136.

Refining and bleaching of oils removes waxes, free fatty acids, color impurities and oxidation products. Bleaching can be done in the dodorizer or can be a separate operation wherein the oil is treated with an absorbent earth. Deodorizing which involves a steam stripping operation under vacuum removes low molecular weight compounds, i.e., free fatty acids, aldehydes, ketones, hydrocarbons etc. In addition, the natural terpenes present in the oils are also removed. Refined and bleached but undeodorized sunflower seed oil contains a number of terpenes. These include alpha- and beta-pinene, camphene, sabinene, myrcene, alpha- and gamma-terpinene, alpha-phellandrene, limonene and other similar materials. These are present individually at a level of ~500 to <1 ppm. When from 0.1% to 5% of an undeodorized sunflower seed oil is added to an unsaturated vegetable oil, the levels of these individual monoterpenes in the finished oil ranges form less than 0.1 ppm (part per million) up to 25 ppm. Typical terpenes present in undeodorized sunflower oil are:

|  | PPM |
| --- | --- |
| Alpha-pinene | 5–436 |
| Camphene | 5–74 |
| Sabinene | 0–28 |
| Beta-Pinene | 0–13 |
| Myrcene | 0–6 |
| Alpha-phellandrene | 0–7 |
| Alpha-terpinene | 0–79 |
| Para-cymene | 0.5–21 |
| Limonene | 3–48 |
| Gamma-terpinene | 0.6–24 |

These ranges include bleached oils.

It has been found that when a refined and bleached but not deodorized sunflower seed oil containing the pinenes, camphene, limonene, myrcene, terpinenes and sabinene is added to an unsaturated vegetable oil, for example, refined, bleached and deodorized sunflower oil, corn oil, canola oil, safflower oil and soybean oil, the composition has a reduced offensive odor. While the exact terpene which blocks or masks this odor is not known, it is believed that the combination of the terpenes and other volatiles present in the undeodorized sunflower seed oil provide the masking of the aroma and flavor. In particular it is believed that camphene and alpha-pinene play an important role in this masking.

The terpenes from the undeodorized sunflower seed oil can be stripped from the oil and added to an unsaturated oil. This stripping is achieved by heating the oil to 180° C. to 220° C. under vacuum and sparging it with nitrogen and steam. The atmosphere should be non-oxidizing. Nitrogen, carbon dioxide, helium, steam or other insert gas can be used for the stripping. The removed volatiles are condensed at temperatures from 0° C. to −125° C. These stripped volatiles can be added to unsaturated oils at a level equivalent to the addition of 0.1% to 5% of undeodorized sunflower seed oils, usually from 0.003% to 0.1% is used to effect masking.

The earth bleaching processing can isomerize the terpenes. The acid activity of the bleaching material controls the extent of isomerization. Alpha-pinene easily isomerizes to camphene in a temperature dependent, acid catalyzed rearrangement. This rearrangement is minimized by treating refined sunflower oil with 3% to 20%, and preferably from 8% to 12%, silica gel at relatively low temperatures in the of 100° F. (37.8° C.) to 180° F. (82.2° C., preferably from 135° F. (57° C.) to 145° F. (63° C.). Any commercial silica gel can be used. A preferred silica gel is Kiesel gel adsorbent from EM Science, Gibbstown, N.J. The silica gel is preferentially removed from the oil by pressure filtration, rather than vacuum filtration to minimize the loss of sunflower oil volatiles. Use of vacuum filtration is also feasible if the oil is cooled below about 100° F. (38° C.) to minimize volatiles loss during the filtration. Earth bleaching carried out in this manner also improves the flavor of the sunflower oil.

Similar terpenes are found in citrus oil, eucalyptus oil, almond oil and the like. These oils provide some masking of the room aroma, but are not as effective as that of the undeodorized sunflower seed oil. It is believed that the particular combination and ratios of the terpenes present in the sunflower seed oil provide this benefit.

Another benefit of this undeodorized sunflower oil is its ability to provide a better flavor in aged or stored canola and soybean oils.

This undeodorized sunflower oil is added to an oil. Preferred oils are canola oil, soybean oil or soybean oil/canola oil mixtures which comprise at least 90%, preferably at least 95%, more preferably at least 99%, of the cooking oil composition. All percentages and ratios herein are "by weight" unless specified otherwise. When a soybean oil/canola oil blend is used, the canola oil comprises from 5% to 90% of the blend. Preferably these blends comprise from about 25% to 80% soybean oil and 20% to 75% canola oil.

Soybean oil is a highly unsaturated oil which can be obtained from the seeds of the legume, Soja max. The ratio of unsaturated to saturated acids ranges from about 8:1 to about 4:1 and the iodine value of the oil is typically in the range of form about 120 to 141.

Canola oil (also called low erucic acid rapeseed oil) is a highly unsaturated oil which can be obtained from the seeds of the plants *Brassica napus* or *Brassica campestris*. Approximately 94% of the fatty acid content of canola oil is unsaturated fatty acids, and the iodine value is typically in the range of from about 111 to about 120.

Other oil compositions include safflower, cottonseed, deodorized sunflower seed and corn oils and mixtures of these oils with canola, soybean or sunflower seed oil. Fatty acid monoglyceride or diglycerides at levels up to about 10%, other emulsifiers and/or anti spattering agents such as silicones or ethoxylated fatty acid esters of sorbitan at levels up to about 1%, and trace ingredients such as antioxidants and fat-soluble vitamins at levels up to about 0.5% can be included.

The cooking oils used in the compositions of the present invention should be refined, bleached and deodorized. Refining, bleaching and deodorizing treatments can be done before or after the cooking oils are blended. Deodorization cannot be done after the undeodorized sunflower oil is added.

The present invention will be illustrated by the following example.

Room Odor Test

Cooking oil compositions were tested for the room odor produced by the oils when heated. The testing was done substantially according to a technique described in J.A.O.C.S., Vol. 56, 659-63 (Jul. 1979), incorporated by reference herein.

Briefly, a deep fat fryer containing 700 ml of the test oil is located under a small hood which is connected by ducts to an odor evaluation room. The room is approximately 5 ft × 8 ft × 10 ft (1.53 m × 2.75 m × 3.05 m). The oil is heated to frying temperatures (365° F./185° C.). The odor from the heated oil is drawn through the room by exhaust ducts along the floor of the room. Two such rooms are available for testing.

Expert judges enter an odor evaluation room through three buffer rooms which are at a positive pressure relative to the odor evaluation room to prevent premature exposure to the odors. Once inside, the judges evaluate the odor and enter their response on a ballot. The intensity and character of the aroma are assessed by the panel. Each test uses 12-15 judges, typically and each judge does two odor evaluations per day.

EXAMPLE 1

Refined and bleached sunflower oil possessing a total monoterpene content of 219 ppm with a monoterpene composition of 9% alpha-pinene, 39% camphene, 2% myrcene, 1% alpha-phellandrene, 17% alpha-terpinene, 9% para-cymene, 23% limonene, was added to refined bleached and deodorized canola at 0.15% by weight. The aroma was tested by heating the oil containing the refined and bleached sunflower in a room and in a similar room heating refined bleached and deodorized canola. Expert panelist evaluated the intensity and character of the heated aromas produced. The sample containing the refined and bleached sunflower oil was found to have a less intense and more desirable aroma than the sample containing only refined and bleached and deodorized canola oil. In addition, accelerated aging tests were conducted and the oil flavor was found to have developed less oxidized aged flavor than a similarly treated sample of canola or soybean oil.

EXAMPLE 2

Refined and bleached sunflower oil possessing a total monoterpene content of 233 ppm oil concentration with a monoterpene composition of 51% alpha-pinene, 14% camphene, 1% beta-pinene, 3% myrcene, 3% alpha-phellandrene, 7% alpha-terpinene, 7% para-cymene, 14% limonene, was added to refined bleach and deodorized canola at 0.5% by weight. The aroma was tested by heating the canola oil containing the refined and bleached sunflower in a room and in a similar room heating refined bleached and deodorized canola. These were not done by the procedure described above in the room aroma test. Expert panelist evaluated the intensity and character of the heated aromas produced. The sample containing the refined bleached sunflower oil was found to have a less intense and more desirable aroma than the sample containing only refined and bleached and deodorized canola oil.

EXAMPLE 3

Refined and bleached sunflower oil possessing a total monoterpene content of 253 ppm oil concentration with a monoterpene composition of 72% alpha-pinene, 7% camphene, 1% beta-pinene, 2% myrcene, 3% alpha-phellandrene, 3% alpha-terpinene, 5% para-cymene, 7% limonene, was added to refined bleached and deodorized canola at 0.5% by weight. The aroma was tested in homes by 31 nonexpert panelists who fried chicken and popcorn using the oil containing the refined and bleached sunflower and an oil consisting only of bleached and deodorized canola oil. Overall 21 of the panelists preferred the aroma of the product containing refined and bleached sunflower oil.

EXAMPLE 4

Refined sunflower oil was stirred with 10% by weight Kiesel gel adsorbent for 1 hour at 140° F. and then filtered under pressure to limit the loss of volatiles. The resulting product with a total terpene content of 337 ppm with a monoterpene composition consisting of 86% alpha-pinene, 2% camphene, 7% sabinene, 3% beta-pinene, 1% limonene and less than 1% each of alpha-terpinene, para-cymene, and gamma-terpinene was added to refined bleached and deodorized canola oil. After aging for 7 days at 140° F., the aroma was evaluated by heating the oil containing the refined, treated sunflower oil to 360° F. and holding it at this temperature for 5 minutes, then adsorbing a 40 gram aliquot of oil into a cotton wad added to the heated oil, placing the oil-containing cotton wad in a one half gallon glass jar and allowing the oil loaded cotton to stand for an hour. Expert panelists found the aroma intensity diminished and the character more pleasant than in a similarly treated sample containing only canola oil. The oil flavor was found to be fresher than similarly aged canola oil or soybean oil.

EXAMPLE 5

The terpenes from undeodorized sunflower seed oil can be stripped form the oil and added to an unsaturated oil. Refined and bleached sunflower oil (1200 g) are added to a 5 liter 3-necked round bottom flask equipped with a nitrogen sparging tube and a steam injection tube. The oil is heated to 205° C. at a reduced pressure of 1 mm Hg and the volatiles are steam stripped form the oil and condensed into a two stage condensing system. The first stage consists of a 500 cc 3-necked flask immersed in dry ice while the second stage is a cold finger apparatus with liquid nitrogen as the coolant. The volatiles in the first stage are recovered by washing the flask with 15 grams of deodorized canola oil after allowing the flask to warm to 25° C. and separating the water from the oil phase using a 60 cc separatory funnel. The volatiles from the second phase are removed by washing the cold finger apparatus with 10 grams of deodorized canola oil after allowing the trap to warm to 25° C. The recovered volatiles from the two stage condensation which are solubilized in deodorized canola oil are then used to mask the aroma in deodorized canola oil. The condensed volatiles to be comparable in concentration to 0.15% undeodorized sunflower oil, are used at a level of 0.0031% in a cooking oil.

What is claimed is:

1. A cooking oil composition having low odor producing tendencies upon being heated, comprising from 0.1% to 5% refined, bleached and undeodorized sunflower seed oil, and from 95% to 99.9% of refined, bleached and deodorized unsaturated vegetable oils, wherein the total terpene level is from 0.1 to 25 ppm in the cooking oil.

2. The composition of claim 1 wherein said vegetable oil is selected from the group of soybean oil, canola oil, safflower oil, corn oil and sunflower seed oil and mixtures thereof.

3. The composition of claim 2 comprising 0.1% to 2% undeodorized sunflower seed oil.

4. The composition of claim 3 wherein said vegetable oil is a blend of soybean oil and canola oil wherein canola oil comprises up to about 90% of the said blend.

5. The composition of claim 2 wherein canola oil comprises up to about 99.9% of said cooking oil.

6. The composition of claim 1 wherein said undeodorized sunflower seed oil contains a mixture of the terpenes, alpha- and beta-pinene, camphene, sabinene, myrcene, alpha- and gamma-terpinene, alpha-phellandrene, and limonene.

7. A cooking oil composition comprising:
   (a) from 0.1% to 5% undeodorized sunflower seed oil which has been refined and bleached by mixing with 3% to 20% silica gel at a temperature of from 100° F. to 180° F. and then filtered; and
   (b) from 95% to 99.9% unsaturated oil, wherein the total terpene level is from 0.1 to 25 ppm in the cooking oil.

8. A composition according to claim 7 wherein said unsaturated oil is canola oil.

9. A composition according to claim 7 wherein said polyunsaturated oil is a blend of refined bleached and deodorized soybean oil, canola oil and sunflower oil.

10. A composition according to claim 7 wherein said sunflower oil is bleached with from 8% to 12% silica gel.

11. A cooking oil composition having low odor producing tendencies upon being heated comprising from 0.003% to 0.1% of the volatiles removed from refined, bleached and undeodorized sunflower seed oil, and from 95% to 99.99% of refined, bleached and deodorized unsaturated vegetable oils wherein the total terpene level is from 0.1 to 25 ppm in the cooking oil.

12. The composition of claim 11 wherein said vegetable oil is selected from the group of soybean oil, canola oil, safflower oil, corn oil and sunflower seed oil and mixtures thereof.

13. The composition of claim 12 wherein said vegetable oil is a blend of soybean oil and canola oil wherein canola oil comprises up to about 90% of the said blend.

14. The composition of claim 11 wherein canola oil comprises up to about 99.9% of said cooking oil.

15. The composition of claim 11 wherein said undeodorized sunflower seed oil volatiles comprises a mixture of alpha- and beta-pinene, camphene, sabinene, myrcene, alpha- and gamma-terpinene, alpha-phellandrene, and limonene.

* * * * *